United States Patent
Atkinson et al.

(10) Patent No.: US 9,538,866 B2
(45) Date of Patent: Jan. 10, 2017

(54) MAGNETICALLY COUPLING MANIKIN JOINTS

(71) Applicant: HANGERLOGIC FAR EAST LIMITED, Fotan (HK)

(72) Inventors: Kevin Atkinson, Woodbridge, CA (US); Kai Fat Poon, Tai Po (HK); Chi Ming Kwok, Kowloon (HK); Wai Ying Lai, Ma On Shan (HK)

(73) Assignee: HANGERLOGIC FAR EAST LTD., Hong Kong (HK)

( * ) Notice: Subject to any disclaimer, the term of this patent is extended or adjusted under 35 U.S.C. 154(b) by 0 days.

(21) Appl. No.: 14/805,684

(22) Filed: Jul. 22, 2015

(65) Prior Publication Data

US 2016/0022058 A1 Jan. 28, 2016

Related U.S. Application Data

(60) Provisional application No. 62/027,932, filed on Jul. 23, 2014.

(51) Int. Cl.
*A47F 8/00* (2006.01)
*G09B 23/30* (2006.01)
*G09B 23/34* (2006.01)
*A41H 5/01* (2006.01)
*F16C 11/00* (2006.01)

(52) U.S. Cl.
CPC . *A47F 8/00* (2013.01); *A41H 5/01* (2013.01); *G09B 23/30* (2013.01); *G09B 23/34* (2013.01); *F16C 11/00* (2013.01)

(58) Field of Classification Search
CPC .......... A47F 8/00; G09B 23/32; G09B 23/34; G09B 23/30; A63H 3/16; A63H 3/46; A41H 5/00; A41H 5/01; F16C 11/00
See application file for complete search history.

(56) References Cited

U.S. PATENT DOCUMENTS

| | | | | |
|---|---|---|---|---|
| 3,246,422 | A * | 4/1966 | Teagarden | A63H 3/46 223/66 |
| 3,375,604 | A * | 4/1968 | Alonso | A63H 3/16 446/92 |
| 6,203,396 | B1 * | 3/2001 | Asmussen | A47F 8/00 446/268 |
| 7,325,996 | B2 * | 2/2008 | Varner | A47F 8/00 223/66 |

(Continued)

*Primary Examiner* — Ismael Izaguirre
(74) *Attorney, Agent, or Firm* — Mila Shvartsman

(57) ABSTRACT

A manikin (mannequin) with limbs that magnetically attach to the torso by an assembly of an attach base mounted on the torso and a lead-in base on the limb. Magnets of one Pole are accommodated within the attach base, and of the opposite Pole within the lead-in base. The magnets attract corresponding magnets of the opposite Pole, facilitating self-aligning of the magnets, whose depth-of-pull force is not over 80 Gauss. The attach and lead-in bases can regulate the attraction force via a layer of flux shield over the magnets for various applications. Attach and lead-in bases have complimentary guiding means to give an assembler a sense of touch through fabric to understand where the limbs are with respect to the torso when forming a joint. The lead-in pin hooks the limb into the torso, allowing limbs to pivot and return to their original position if bumped.

16 Claims, 23 Drawing Sheets

(56) References Cited

U.S. PATENT DOCUMENTS

| 2005/0020179 A1* | 1/2005 | Pillai | A63H 3/16 |
| | | | 446/97 |
| 2011/0003529 A1* | 1/2011 | Ehrsam | A63H 3/46 |
| | | | 446/376 |
| 2013/0186922 A1* | 7/2013 | Soto Velasco | A47F 8/00 |
| | | | 223/66 |

* cited by examiner

MAGNETICALLY COUPLING MANIKIN JOINTS

This application is based on U.S. Provisional application No. 62/027,932, filed Jul. 23, 2014. The present invention relates to a joint for a form or manikin (mannequin). The joint of the present invention significantly reduces the time it takes to dress a manikin. The limb is joined to the manikin by magnetic force. This invention is limited only to manikins that can be made of a blow-moldable thermoplastic material due to weight limitations.

BACKGROUND

In the retail garment industry, it is typical to use forms or manikins (mannequins) to display clothes. For the retail store, it is nearly impossible to dress a form or manikin if the limbs cannot be removed.

Assembling a dressed manikin is a time-consuming task. Once the limbs are inserted into the display clothes, attaching them to the torso is complicated and requires experience. It is difficult to manipulate the limbs into position, and more so if the clothing on display has to appear tight-fitting.

There is known U.S. Pat. No. 5,727,717 issued on Mar. 17, 1998 to Patrick Vigne. Vigne discloses a structure comprising an upper leg 2 provided with a magnet assembly 20 comprising block magnet 22, and provided with a joint surface 6. A lower leg 4 has a ferromagnetic plate 14 incorporated within joint surface 8 of lower leg 4.

Magnetic assembly 20 of upper leg 2 is adapted to cooperate with ferromagnetic plate 14 when upper leg 2 and lower leg 4 engage each other and mate together when joint is assembled. The joint surface 8 of the lower leg 4 has a flat portion 10 corresponding with a generally flat portion 12 of the joint surface 6 of the upper leg 2. A ferromagnetic plate 14 is let into the portion 8, more or less flush.

The present invention comprises an attach base mounted onto the torso and provided with a plurality of North Pole magnets incorporated into magnet compartments or rooms, and provided with flux shield that regulates attachment force of the magnets. The attach plate is adapted to cooperate with the lead-in base mounted on the limb, which is provided with a plurality of South Pole magnets incorporated into magnet compartments, and provided with a flux shield that regulates the attachment force of magnets. The lead-in base contains lead-in pin and location block adapted to be accommodated within corresponding openings made in the attach base.

The two designs are completely different even though in both arrangements, both joint elements, such as upper and lower legs of Vigne, and torso and arm of the present design, use two magnets incorporated in the respective parts. Vigne uses magnets of different configuration, such as block-shaped magnet 20 and ferromagnetic plate 14, while the present design uses a plurality of magnets incorporated in magnet rooms of attach and lead-in base. Vigne also attaches portions of the manikin in a different way.

There is also known U.S. Pat. No. 6,705,794 issued on Mar. 16, 2004 to Richard Varner et al disclosing a manikin incorporating attracted material or metallic plate 12 in its body portions, adapted to cooperate with a magnetic assembly 14.

Magnetic assembly 14 consists of a pole piece 70 in the form of the cup and provided with a ring magnet 72 which are in contact with sides and bottom of said cup 70. On top of this ring magnet 72 are two neodymium magnets 74. Magnetic assembly 14 is provided with mating pin 18 adapted to mate with the corresponding mating hole 32 formed in metallic plate 12. Magnetic assembly 14 is also provided with indexing pin 16 adapted to cooperate with a plurality of indexing holes 34 formed in said metallic plate 12.

The Varner design allows removable pieces of manikin to move toward manikin at a distance from the manikin of more than ¼ of an inch before mating of magnetic assembly and attract material will engage each other, which is the gist of Varner's invention.

The present invention comprises an attach base mounted on to the torso and provided with plurality of North Pole magnets incorporated into magnet compartment or rooms, and provided with flux shielding to regulate the magnets' attachment and attraction force. The attach plate is adapted to cooperate with the lead-in base mounted on the limb, which is provided with a plurality of South Pole magnets incorporated into magnet compartments, and provided with a flux shield to regulate strength of magnets. The lead base contains lead-in pin and location block adapted to be accommodated within corresponding openings made in the attach base.

Varner's arrangement is substantially different from the present design even though the same type of magnetic material, neodymium, is used, and they have similar arrangements to connect pieces, such as indexing and mating pins of Varner and lead-in pin and location block of the present invention. Varner's design has magnets only on one mating piece, while the present invention has magnets incorporated into both mating pieces. The essence of Varner's invention is the attraction between the two mating pieces forcing them to move towards each other before final mating, while the present design has a straight-forward fixing of arms onto a torso by means of lead-in pin and location block.

If, hypothetically, Varner replaces metal (steel) plate 12 by another magnet as a "magnetically adherent material", it will have a 50% chance to be attracted and 50% chance to be repelled for the obvious reason that magnets 72 and 74 of Varner has two opposite poles: South and North, while in the present invention it is specifically pointed out that limb side has North oriented magnets and body side has South oriented magnets.

U.S. Pat. No. 6,203,396 issued on Mar. 20, 2001 to Christopher Asmussen et al. comprises a mannequin provided with a male portion 10 incorporated within arm and a female portion 20 incorporated within torso of mannequin. Male portion 10 has a disk-shaped configuration with a cylindrical projection 13 extending from the bottom surface of male portion 10. Lower surface 14 of projection 13 is provided with ferromagnetic material.

Female portion 20 also has a disk-shaped configuration and is provided with downwardly-extending receptacle 23 adapted to accommodate circular projection 13 of male portion 10. A magnet 24 is incorporated within bottom part of receptacle 23 and is adapted to cooperate with ferromagnetic surface 14 of male portion 10 when manikin is assembled.

Even though the present design and the Asmussen patent both comprise two magnets incorporated in mating pieces of a mannequin, the Asmussen design is completely different from the present invention. Arrangement of male portion 10 and female portion 20 are totally different from the attach base and lead-in base of the present invention. Asmussen uses a cylindrical projection 13 to mate receptacle 23, while the present design uses a lead-in pin and location block to connect arm to torso.

The present design of the magnetic arrangement is also different from Asmussen. Asmussen uses block-shaped magnet 24 to cooperate with ferromagnetic surface 14 while the present invention uses a plurality of magnets incorporated into specially designed rooms or compartments.

OBJECT OF THE INVENTION

The present invention provides easily-assembled magnetically coupled joints on a manikin or form. This is accomplished by strategic placement of magnets that are necessary to hold the joint together. The present invention also offers variable placement of the magnets depending on desired parameters.

This invention facilitates dressing a manikin faster and safer due to the relatively weak magnets necessary to achieve the desired result. If a user's finger is caught between two magnets of the present invention, the pinching that results by the magnets attracted to one another is insufficient to break any bones or dislocate any finger joints. This is an advantage over prior art, since the prior art uses magnets that can inflict bodily harm if a user is not exercising caution.

DETAILED DESCRIPTION OF THE PREFERRED EMBODIMENT

The present invention discloses a magnetic joint assembly for a form or manikin. The principle of this invention is two sets of magnets, one in the torso and one in the limb, but other arrangements are possible. The magnets exert an attraction force, thus locking a joint quickly and effortlessly. In the preferred embodiment, guiding means assure a proper mating between the components. However, in some embodiments it is possible to achieve the desired result with an assembly other than a pin and hole, or without guiding means at all.

In an embodiment without guiding means, once attached, said limb will return to its original position should it be lightly bumped downwardly or upwardly. However, it will fall off if bumped with substantial downwardly or upwardly force. For example, a guiding means is unnecessary in cases where a mannequin is in a display window with no browsing customer access.

While the following describes the preferred embodiment, it should be understood that any arrangement is available where a set of magnets and guiding means are used in both parts that make up a manikin joint.

Figure 1:
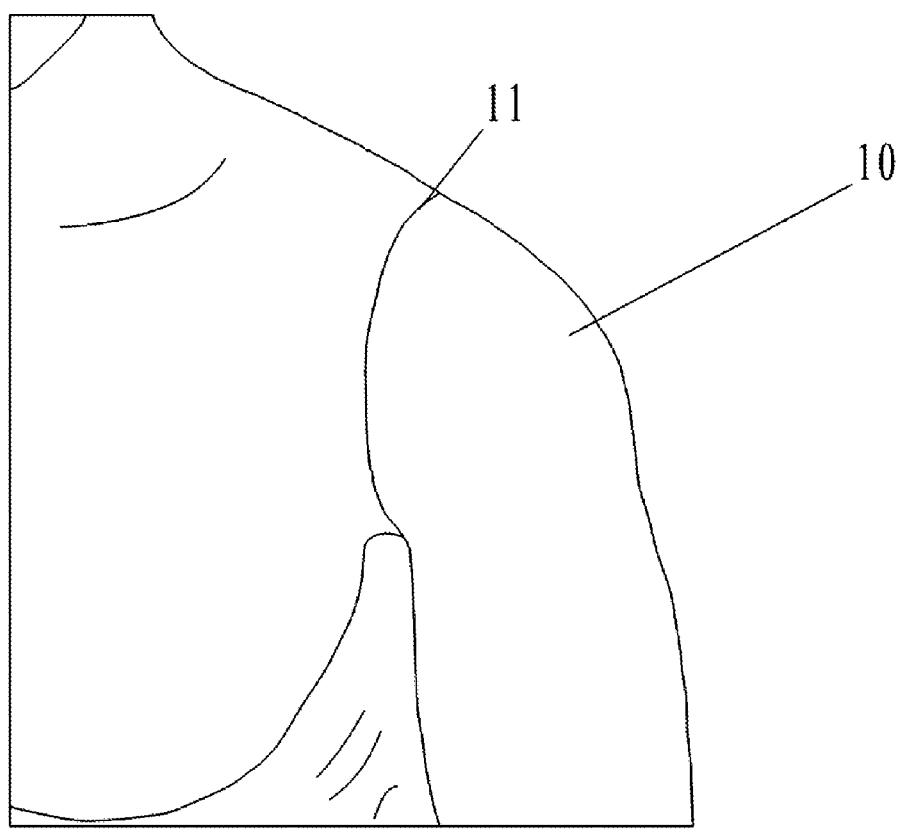
FIG. 1 shows a perspective view of the manikin joint as described in the present invention.
Figure 2:
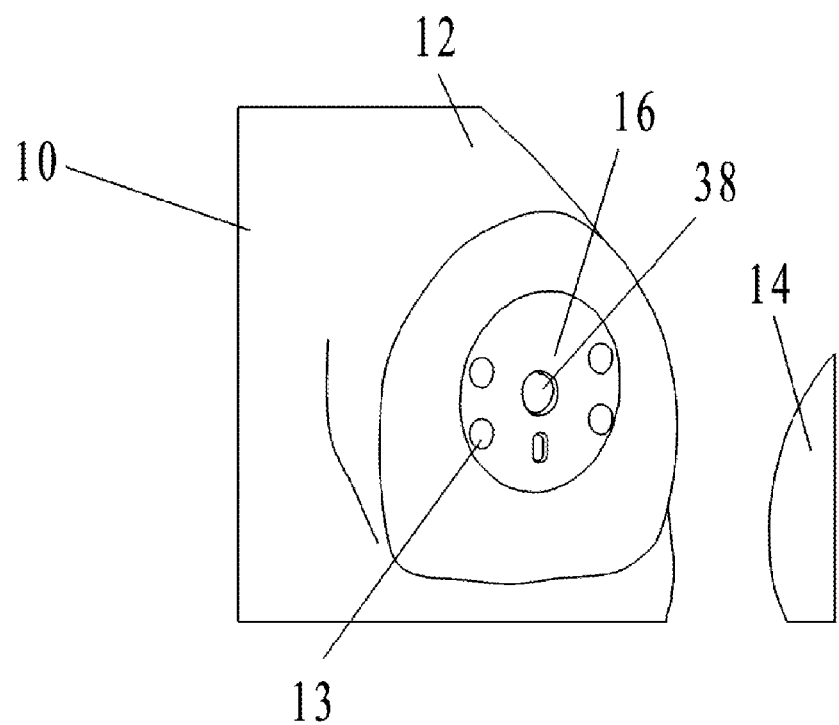
FIG. 2 shows a disassembled view of the present invention.

Referring now to drawings, FIG. 1 shows a perspective view of an arm joint 11 of a manikin or form 10. FIG. 2 shows torso 12's attach base 16, with detached limb 14. Attach base 16 comprises a circular panel with four screws or rivets 13 holding attach base 16 in place, lead-in hole 38 substantially in the middle of attach base 16, and guiding hole 40 below lead-in hole 38. It should be mentioned that attach base 16 can be affixed with screws or rivets 13, or any other acceptable affixing method.

Figure 3:
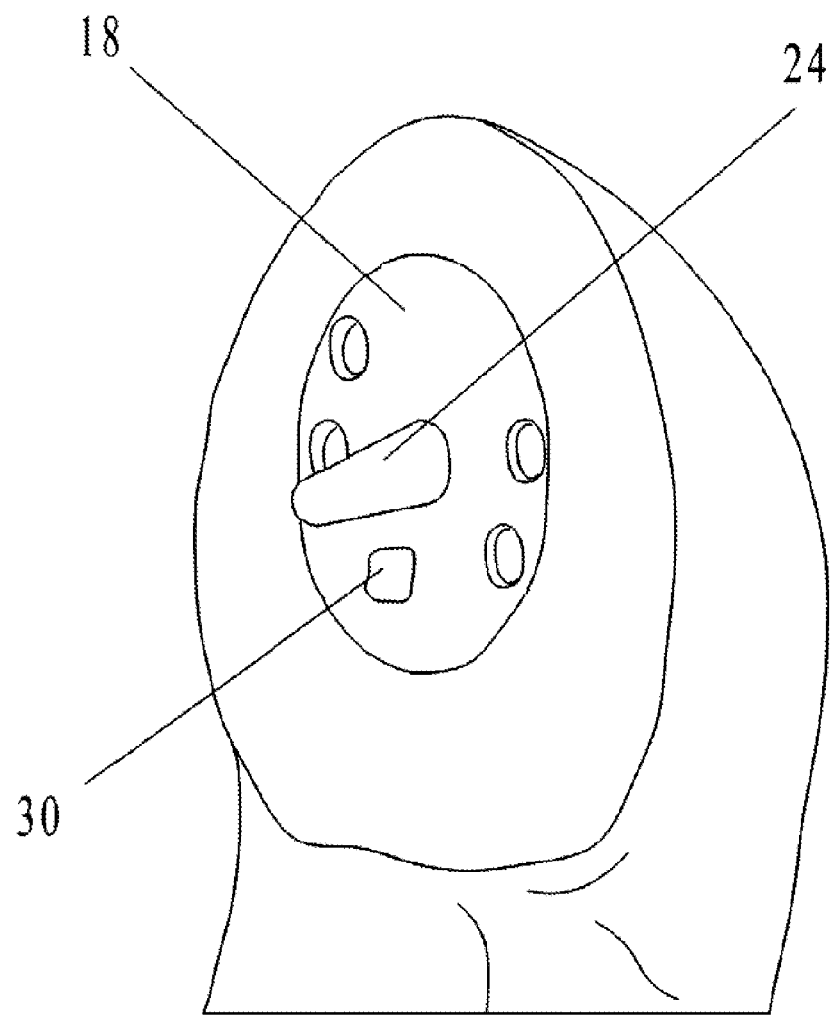
FIG. 3 shows the lead-in base on the limb of FIG. 1.

FIG. 3 shows lead-in base 18 on limb 14 comprising a circular panel with four screws or rivets 13 holding lead-in base 18 in place. In the middle of lead-in base 18 protrudes lead-in pin 24 of substantially conical configuration with a smooth end, and location block 30 of a rectangular configuration with smooth walls, substantially below lead-in pin 24. The lead-in pin 24 is designed to give the operator a sense of touch, to know where the terminus of limb 14 is with respect to torso 12 when forming joint 11 as assembly 10 is being dressed. Lead-in pin 24 also has a configuration that forms a hook to hook limb 14 onto torso 12, to share a part of the holding force of limb 14 on torso 12. Lead-in pin 24 also adds a level of stability if manikin assembly 10 is bumped or nudged. Rather than fall out or rotate, limb 14 will pivot or sway and return to its original position due to lead-in pin 24's orientation.

Figure 4:
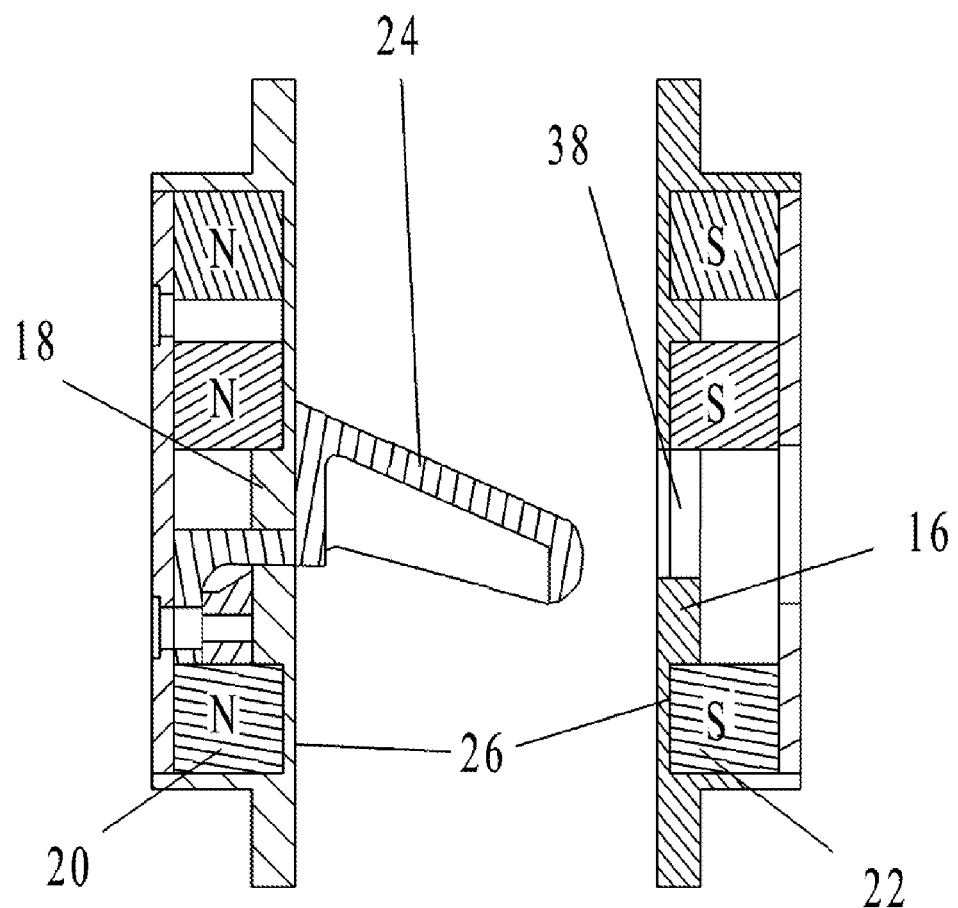
FIG. 4 is a cross-section view of the joint prior to joining.
Figure 5:
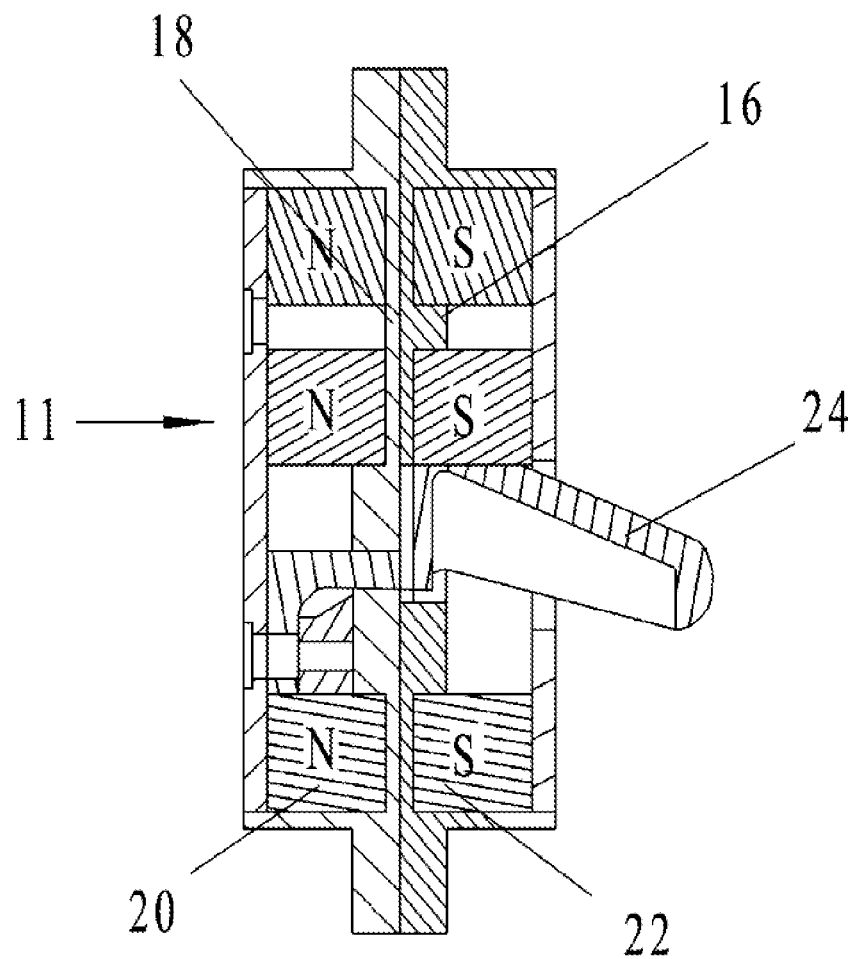
FIG. 5 shows a cross-section view of the present invention.

FIG. 4 shows a cross-sectional view of joint 11 in disassembled mode. Lead-in pin 24 of lead-in base 18 is lined up with lead-in hole 38 in attach base 16. North pole magnets 20 are attracted to south pole magnets 22. FIG. 5 shows joint 11 in assembled mode, wherein lead-in pin 24 has passed through lead-in hole 38, and magnets 20 and 22 hold joint 11 in place.

Figure 6:
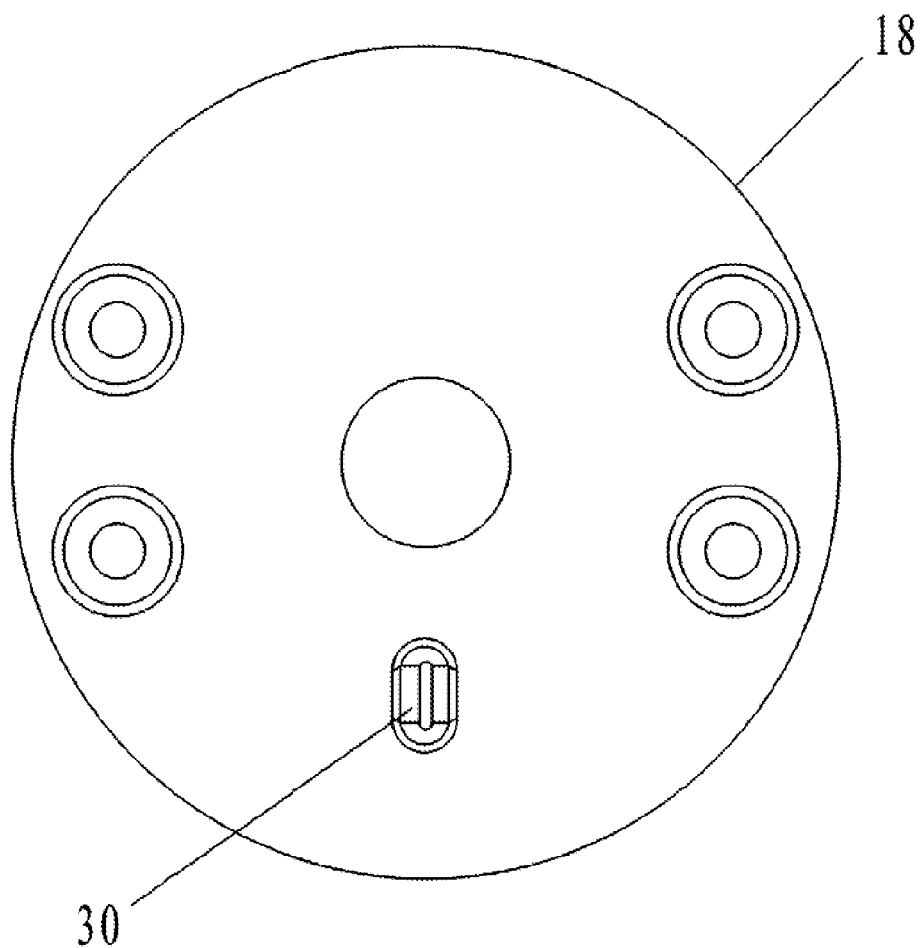
FIG. 6 is a front view of FIG. 3.
Figure 7:
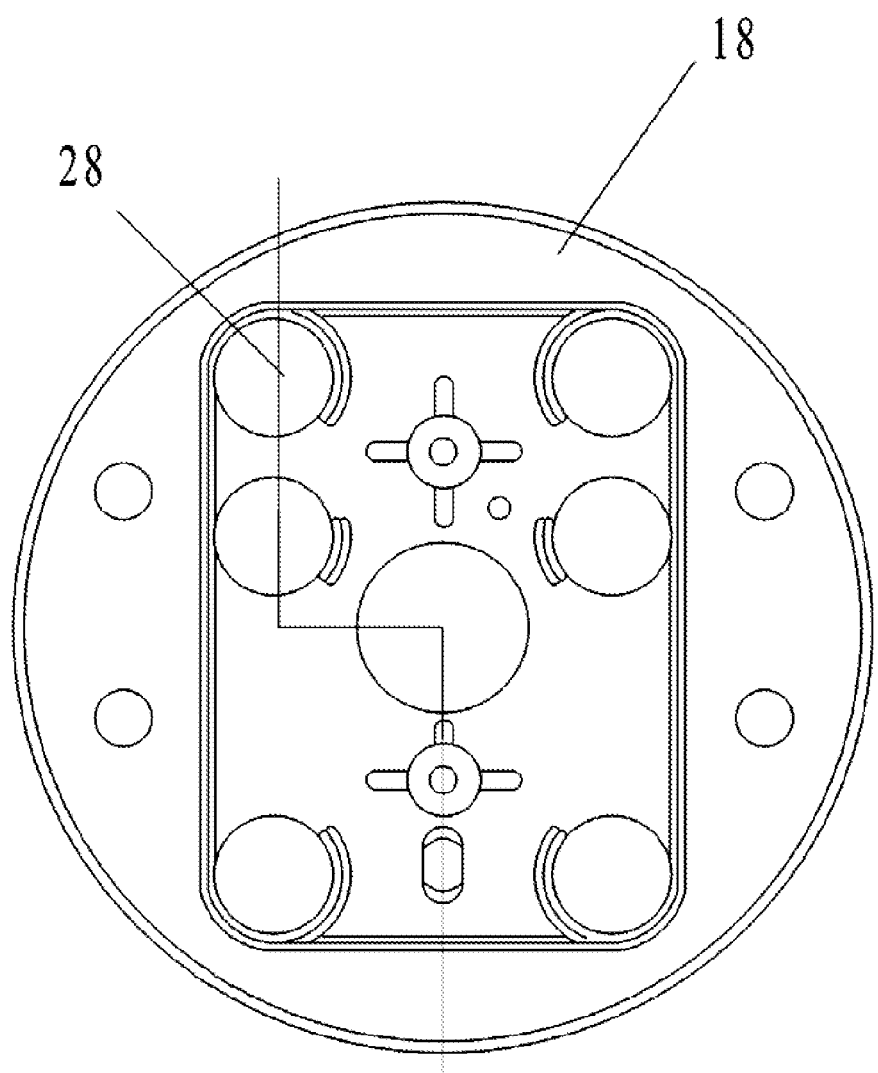
FIG. 7 is a rear view of FIG. 3.
Figure 8:
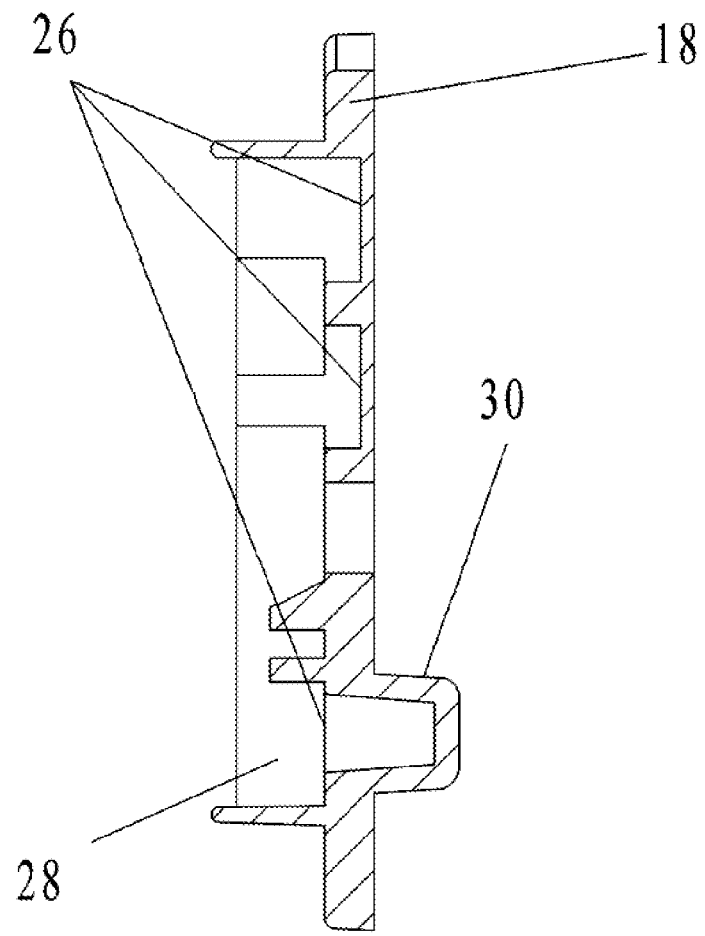
FIG. 8 is a top view of FIG. 7.

FIG. 6 shows the front of lead-in base 18 without lead-in pin 24 or location block 30. FIG. 7 is the rear view of lead-in base 18 showing six round magnet rooms 28. FIG. 8 shows the top view of lead-in base 18 and magnet rooms 28, comprising hollow, cylindrical cavities. Flux shield 26 is present between said cavities and edge of lead-in base 18. Flux shield 26 is designed to control the amount of magnetic flux density to control the attachment force. Flux shield 26 is used as regulating force means. In the preferred embodiment, said flux shield 26 comprises a plastic wall of variable thickness, but the same result can be accomplished by varying the strength of magnets 20 and 22.

The shield thickness can be adjusted from the injection tool. The design thicknesses are 1.0 mm 1.5 mm and 2.0 mm. A variety of flux shield 26 thickness is required should the attachment force for limb 14 be lower as required. For example, sometimes only a partial limb is used to display a garment. The flux shield is made by plastic injection molding, and can be made by various plastic materials. The preferred embodiment uses polycarbonate (PC). The function of the plastic flux shield is to adjust the amount of magnetic flux that passes through the device by changing the shield wall thickness to adjust the magnetic strength (adhesion strength). The maximum magnetic flux strength of the preferred embodiment is not more then 80 Gauss measured from a distance of 1" from device surface, versus U.S. Pat. No. 6,705,794's minimums of 120 to 200 Gauss measured from a distance of 1" from device surface. U.S. Pat. No. 6,705,794's design needs more flux strength because their product (manikin) is too heavy to function if flux strength is below 120 Gauss. The reason the present invention needs less Gauss attraction force is due to the fact that the components of the present manikin are much lighter than prior art, thus requiring less magnets and material. As shown on FIG. 5, North Pole magnets 20 of lead-in base 18 do not touch South Poles magnets 22 of attach base 16, which are separated by flux shield 26, and is substantially different from the design shown in U.S. Pat. No. 6,705,794, wherein magnet does touch a steel plate.

Figure 9:
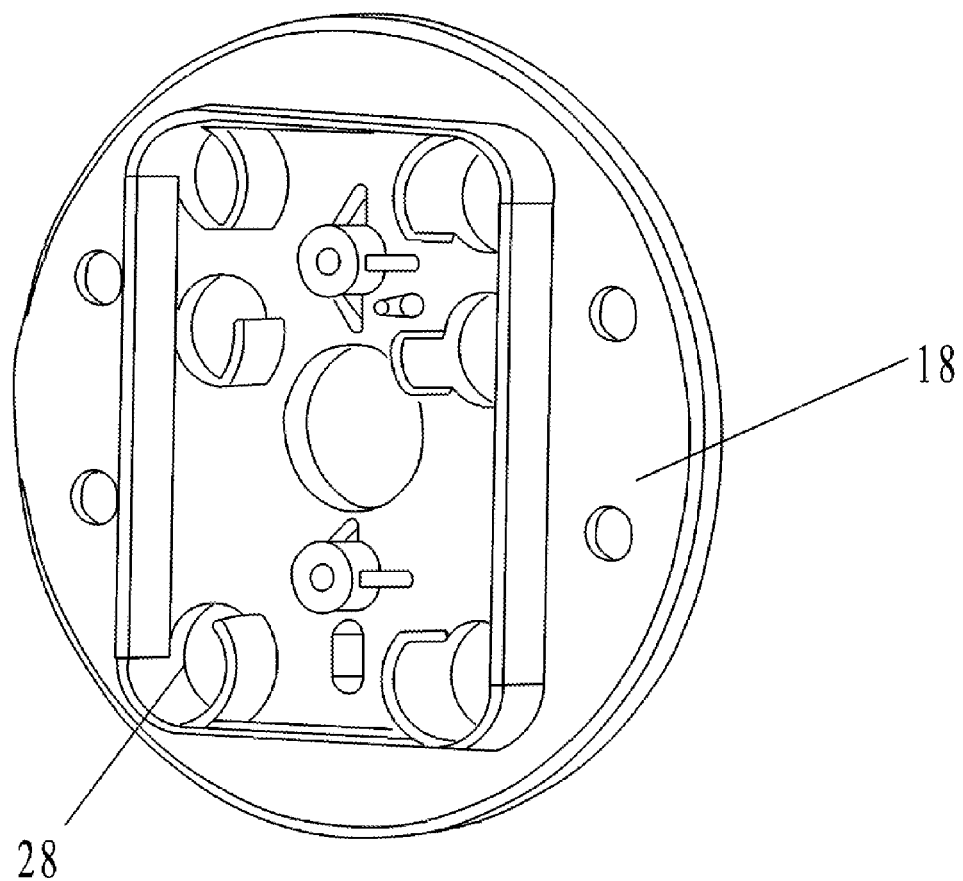
FIG. 9 is a perspective view of FIG. 7.
Figure 10:
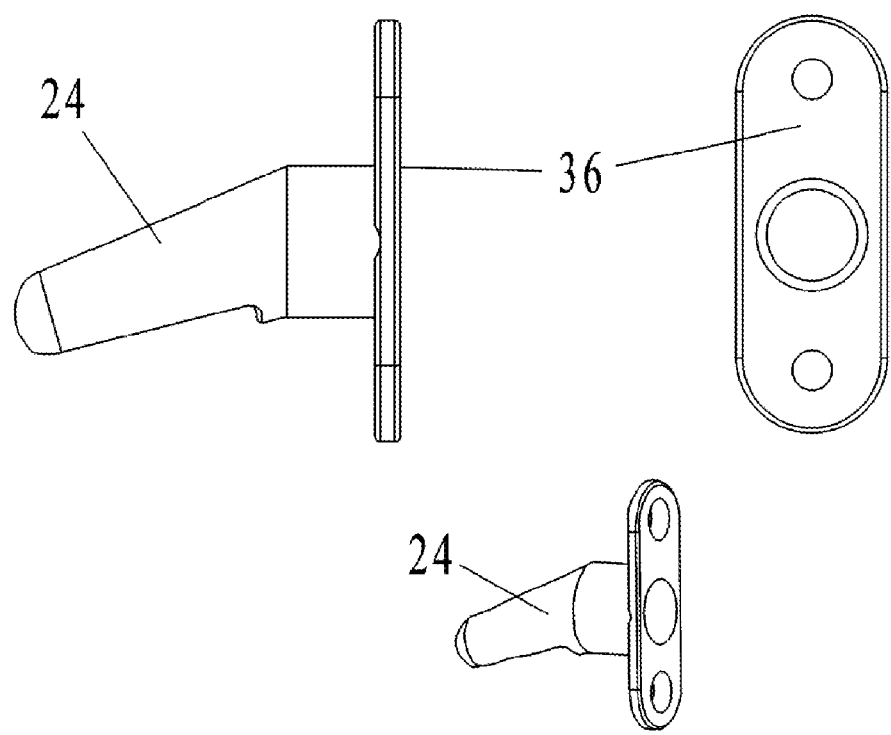
FIG. 10 is a side, back and perspective views of the lead-in pin.
Figure 11:
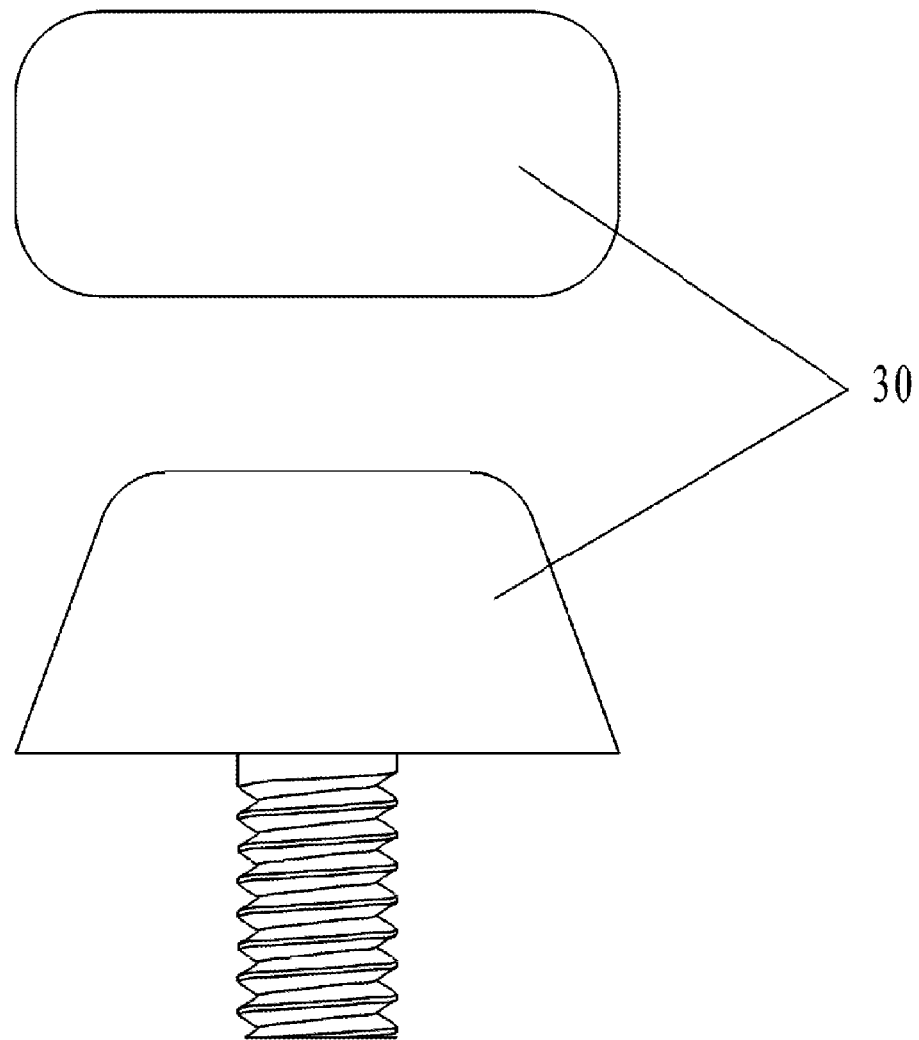
FIG. 11 is a top and side view of the location block.

FIG. 9 shows a perspective view of lead-in base 18 with magnet rooms 28. FIG. 10 shows the top and side views of lead-in pin 24 attached to pin holding base 36. As seen from the top view, lead-in pin 24 has a substantially conical configuration with a smooth end portion and a cylindrical protrusion with threads for attachment by nut in the center of attach base 16. In the side view, lead-in pin 24 has a downwardly slope to accomplish a hook function inside joint 11, to support part of limb 14's weight. Pin 24 is attached to pin holding base 36, forming a unitary body. Pin holding base 36 is mounted on a back side of lead-in base 18 by means of screws (see FIG. 18).

Figure 12:
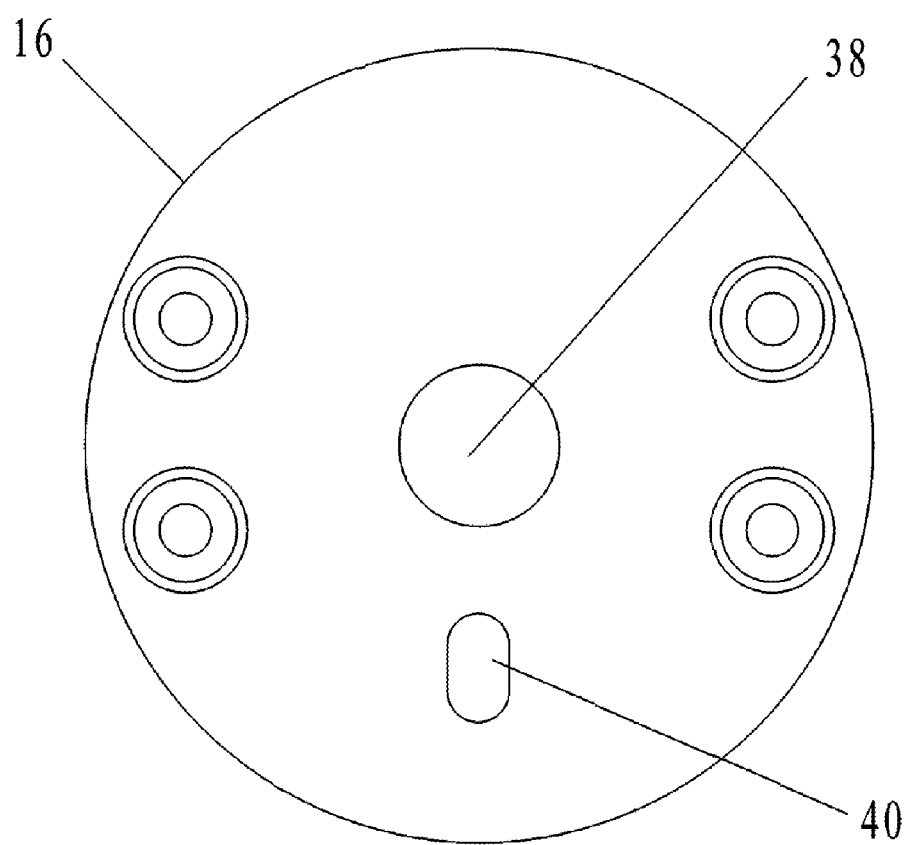
FIG. 12 is the front view of attach base.
Figure 13:
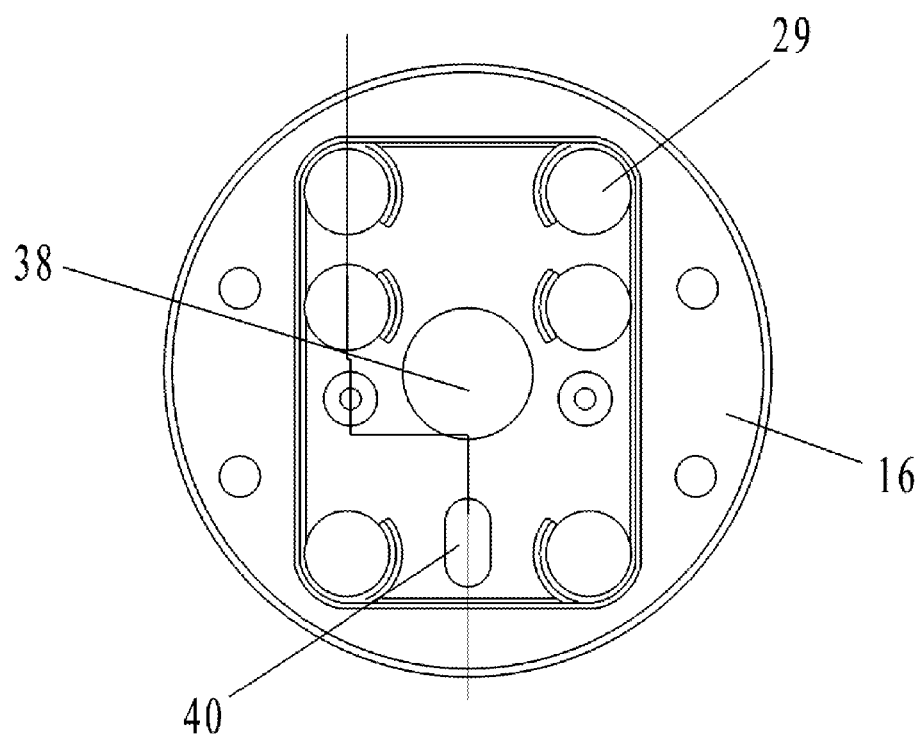
FIG. 13 is the rear view of FIG. 12.
Figure 14:
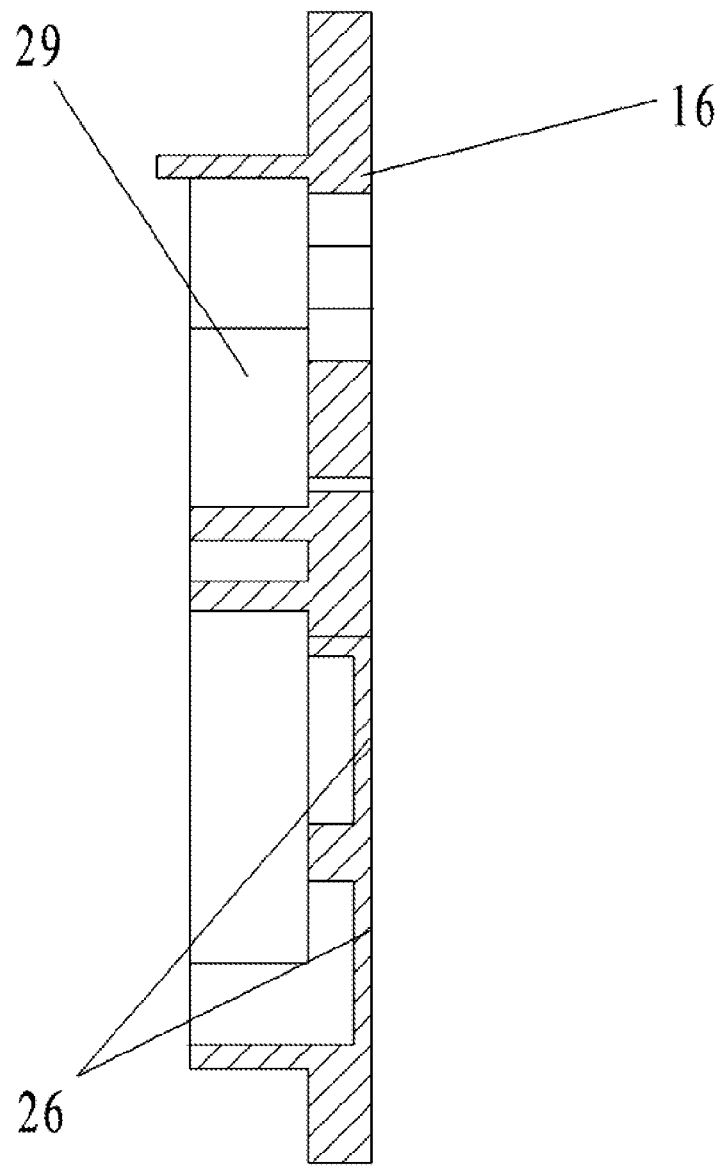
FIG. 14 is the cross-sectional view of FIG. 12.
Figure 15:
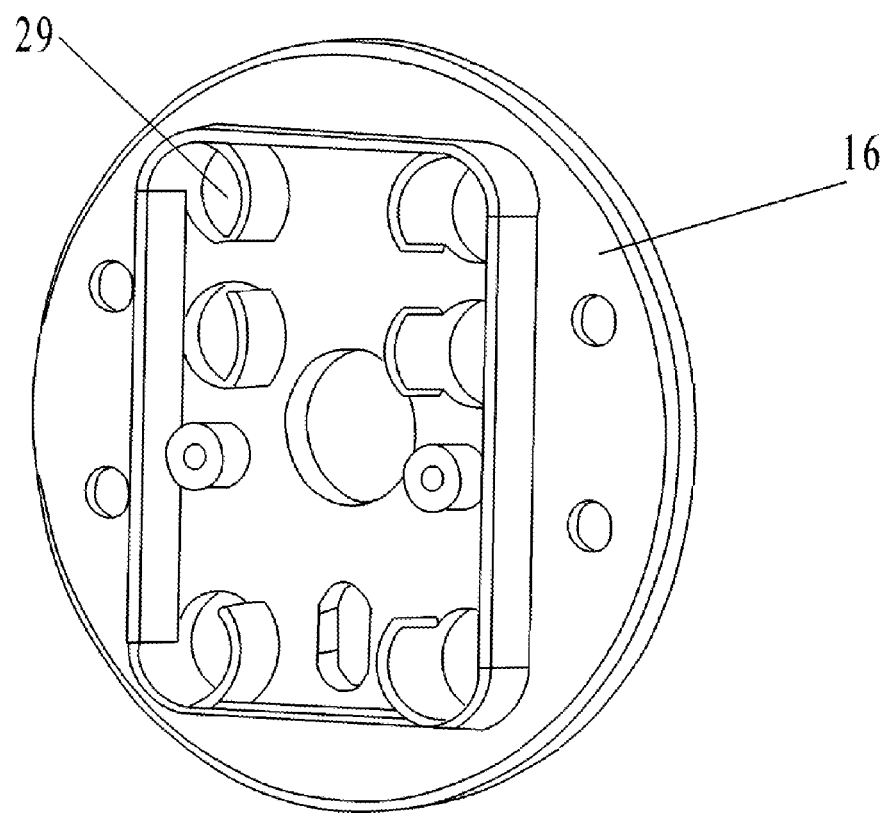
FIG. 15 is a perspective view of FIG. 12.

FIG. 12 is the front view of attach base 16 with a round lead-in hole 38 substantially in the center and rectangular guiding hole 40 below lead-in hole 38. Edges of guiding hole 40 are rounded. FIG. 13 shows the rear of attach base 16 with six magnet rooms 29, lead-in hole 38 and guiding hole 40. FIG. 14 is side view cross-section view of attach base 16 showing flux shield 26 and magnet rooms 29. FIG. 15 is a perspective view of attach base 16.

Figure 16:
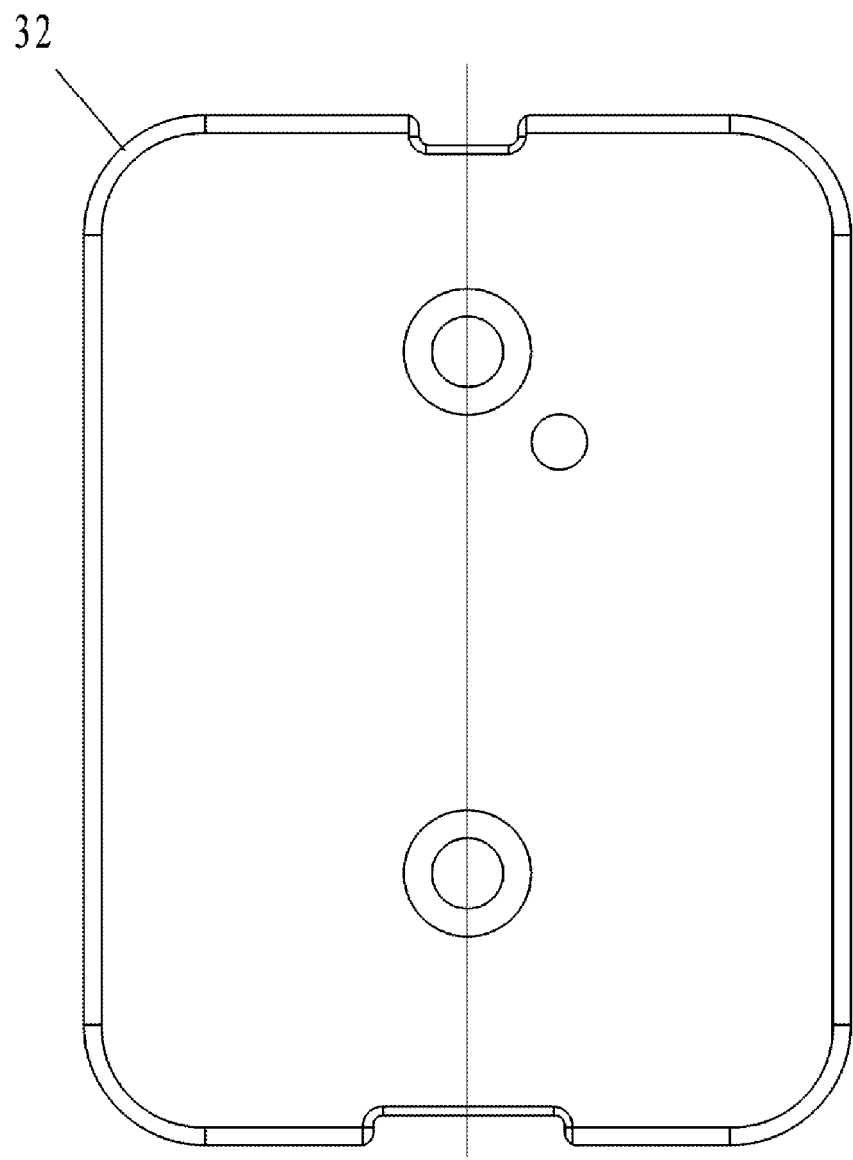
FIG. 16 shows the front view of the lead-in base cover.
Figure 17:
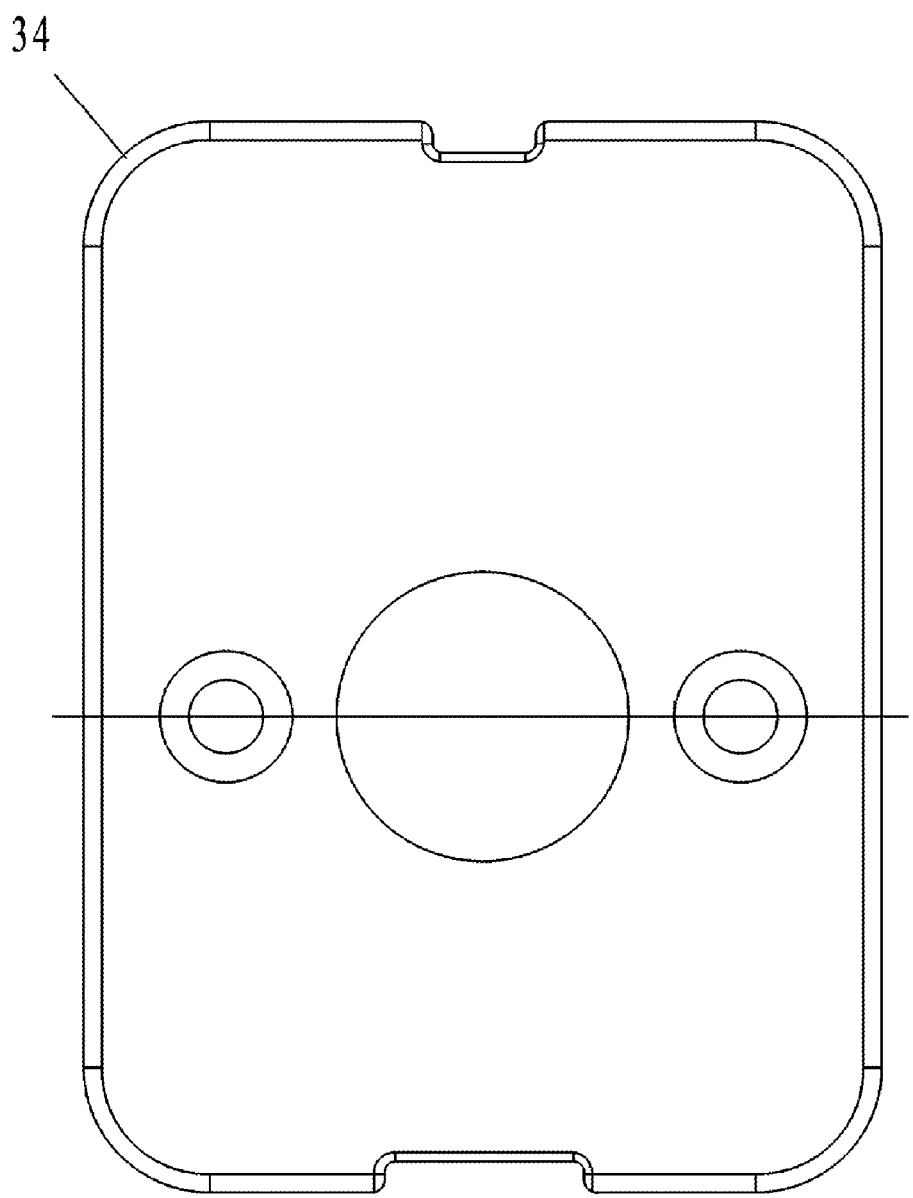
FIG. 17 shows the front view of the attach base cover
Figure 18:
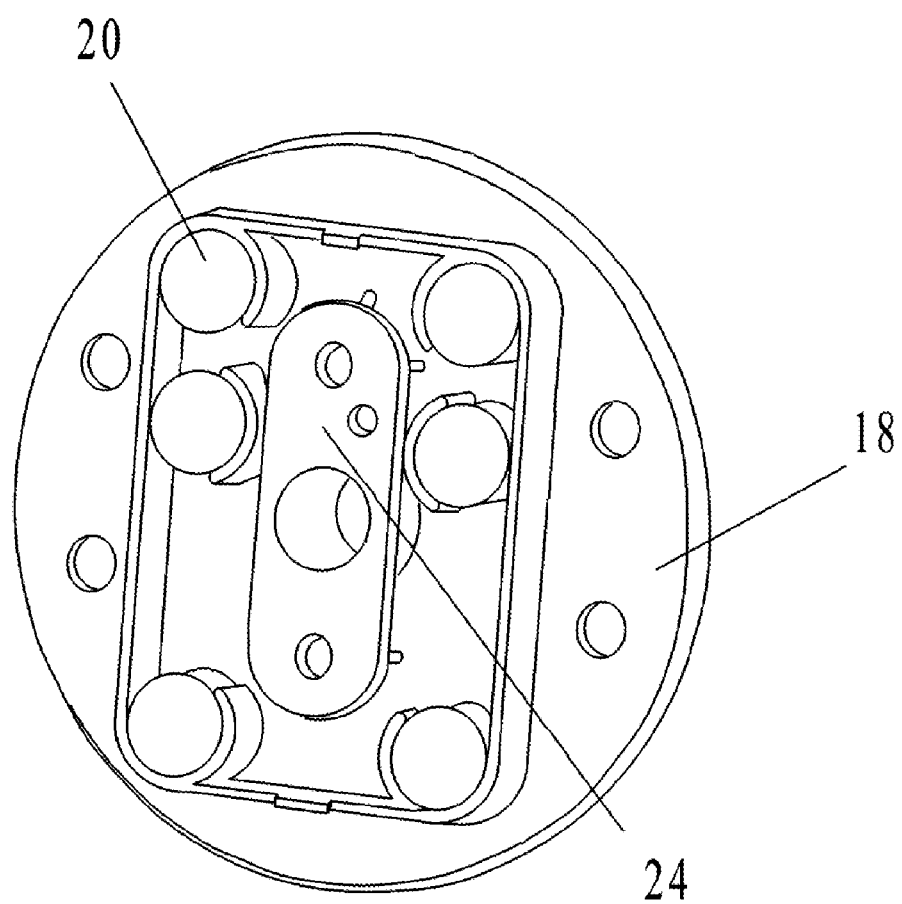
FIG. 18 is a perspective view of FIG. 7 with magnets.
Figure 19:
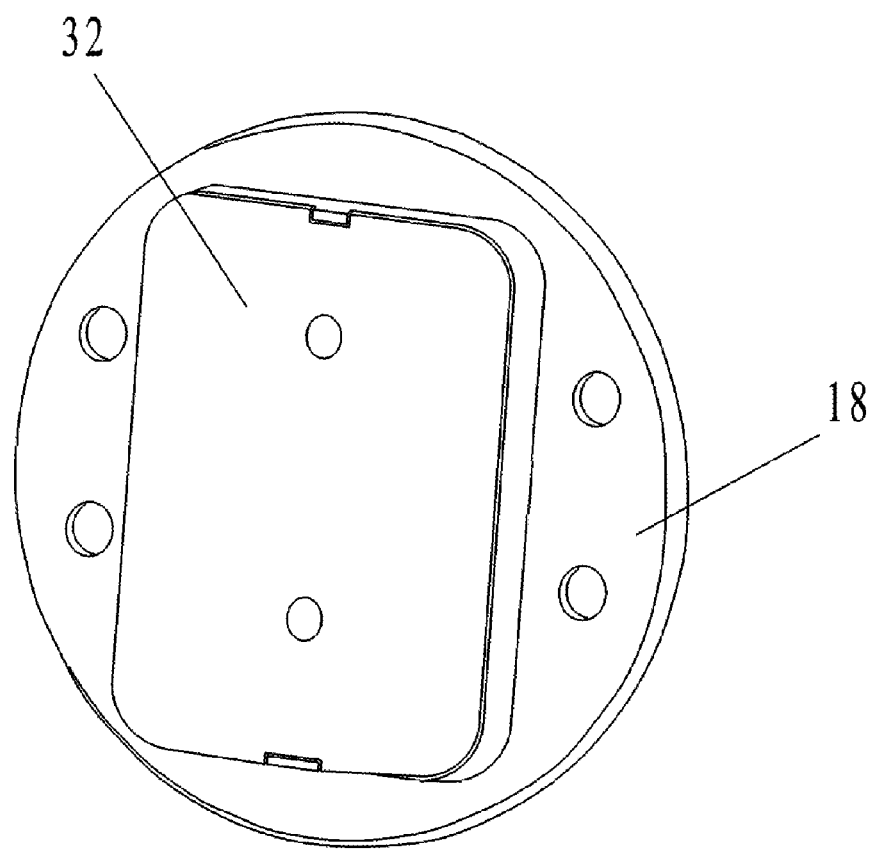
FIG. 19 is a perspective view of FIG. 7 with a cover.
Figure 20:
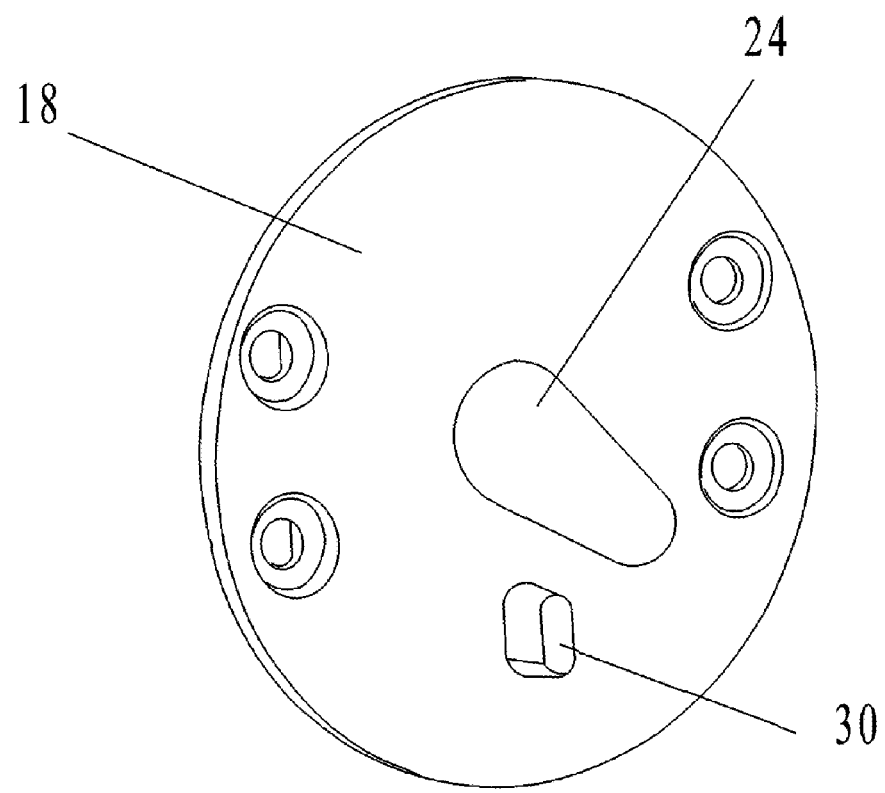
FIG. 20 is a perspective view of FIG. 7.

FIG. 16 is top view of a cover 32 for lead-in base 18, and FIG. 17 a top view of a cover 34 for attach base 16. FIG. 18 is a perspective view lead-in base 18 showing how magnets 20 are oriented with respect to magnet rooms 28. FIG. 19 a perspective view of lead-in base 18 showing how cover 32 is attached to rear of lead-in base 18. FIG. 20 is a perspective view showing the front view of lead-in base 18 with the slightly-downward oriented lead-in pin 24 and location block 30.

Figure 21:
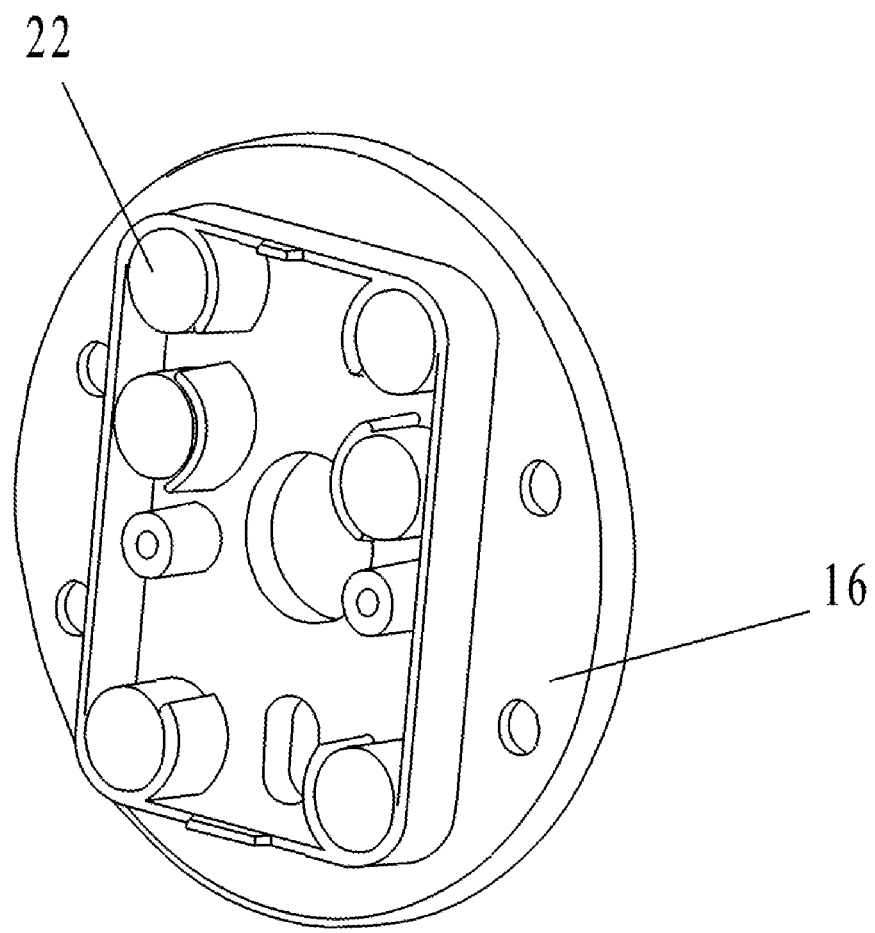
FIG. 21 is a perspective view of FIG. 12 with magnets.
Figure 22:
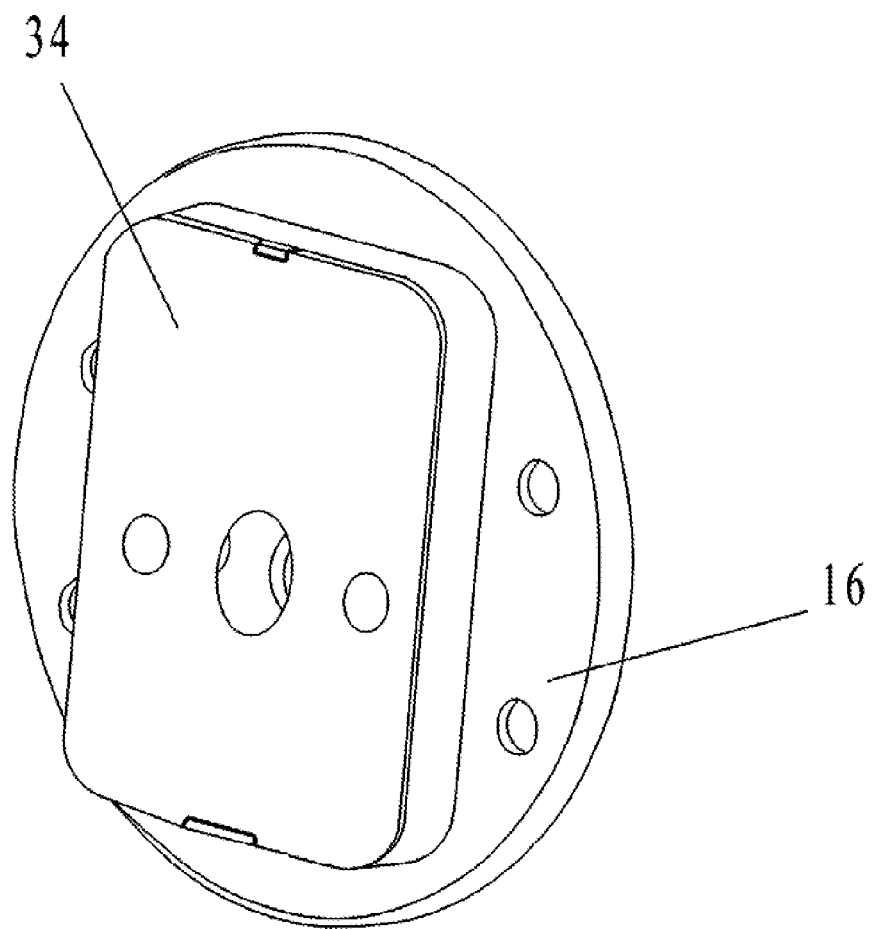
FIG. 22 shows a perspective view of FIG. 12 with a cover.
Figure 23:
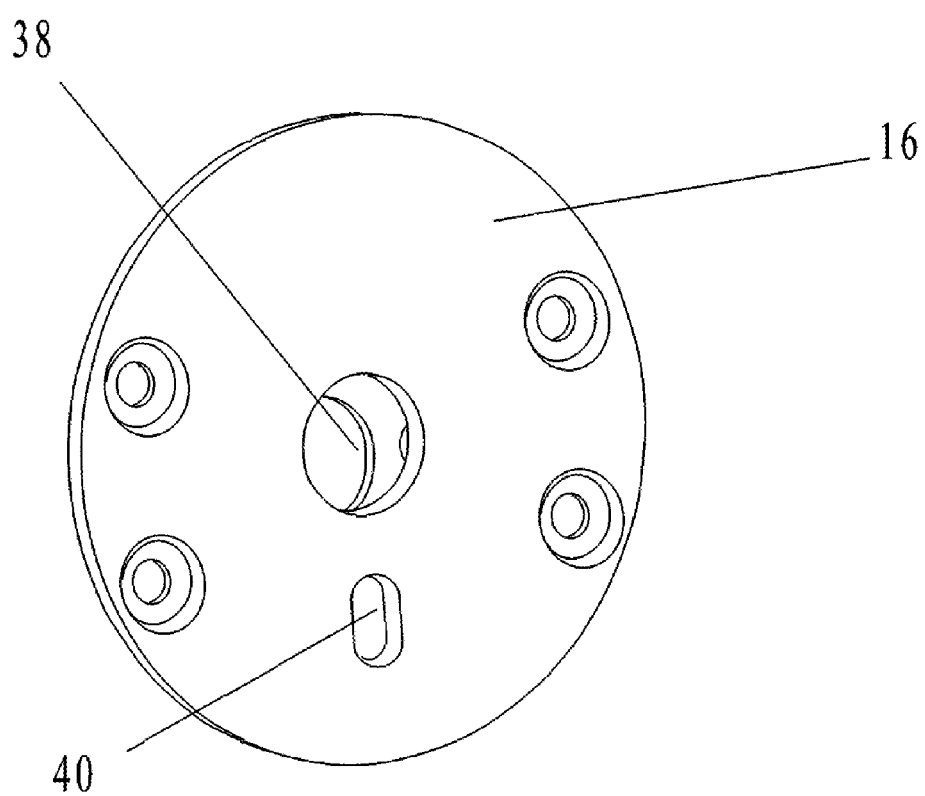
FIG. 23 is a perspective view of FIG. 12.

FIG. 21 shows a perspective view of attach base 16 showing of how magnets 22 are oriented with respect to magnet rooms 29. FIG. 22 is a perspective view of attach base 16 showing cover 34 attached to rear of attach base 16. FIG. 23 shows the perspective view of the attach base showing a front view with lead-in hole 38 and guiding hole 40.

In operation, to dress a manikin assembly 10, an operator would remove limb 14 from torso 12, drape the desirable garment over torso 12, thread limb 14 into sleeve of garment so that lead-in pin 24 could be felt through garment on its way to joint 11. Operator would manipulate limb 14 so that lead-in pin 24 is in proximity of joint 11. Operator then aligns lead-in pin 24 with lead-in hole 38, and inserts pin 24 until the pull of attraction of magnets 20 and 22 mates limb 14 to torso 12. Operator would slightly twist limb 14 to make sure that location block 30 is firmly inside guiding hole 40.

The reason that present invention uses plurality of magnets is because it gives the design a self-align function where each of the South Pole magnets (S1, S2, S3, S4, S5 and S6) incorporated in the torso will attract the nearest North Pole magnets (N1, N2, N3, N4, N5 and N6) incorporated in the limb. This is a very useful feature of the present invention.

In the present invention, magnets of 10 mm diameter and 10 mm thickness are used on both torso and limbs. However magnets of 15 mm in diameter and thickness or 20 mm in diameter and thickness might be used for other locations of the manikin where the holding force needs to be stronger.

It must be emphasized that manikins of the present invention must be made of a blow-moldable thermoplastic or similar material due to weight limitations to make manikin useful in use. In comparison, if manikin of U.S. Pat. No. 6,705,794 were made from the same thermoplastic material, it would function. However, since flux strength would be much higher, it may cause potential injury because of the much stronger attraction force.

It must also be emphasized that dressing a manikin made according to the present invention will be much easier and faster because it is at least 50% lighter than, for example, manikin of U.S. Pat. No. 6,705,794, and it is more durable against scratching, resulting in less attention required during dressing.

The invention claimed is:

1. A manikin (mannequin) having removable limbs attached thereto by an assembly comprising:
   an attach base adapted to accommodate a set of magnets of one Pole, said attach base is adapted to be mounted within a torso of said manikin;
   a lead-in base also adapted to accommodate a set of magnets of the opposite Pole, said lead-in base adapted to be mounted within limbs of said manikin;
   wherein each of magnets of one Pole is adapted to attract corresponding magnet of the opposite Pole, thus facilitating self-aligning action of said magnets;
   said attach base and said lead-in base are provided with regulating force means adapted to regulate an attachment force of said magnets incorporated in said attach base and said lead-in base in different situations of manikin arrangements;
   wherein said attach base and said lead-in base are provided with a complimentary guiding means to give an assembler of said manikin a sense of touch to understand of where a terminus of said limbs is with respect to said torso when forming a joint, wherein said guiding means forms a part of holding force of said limbs on said torso and adds a level of stability if said assembly is accidentally bumped, and
   wherein depth-of-pull force of said magnets is not more than 80 Gauss.

2. A manikin having removable limbs attached thereto by an assembly according to claim 1, wherein said regulating force means is a layer of flux shield placed over said magnets in said attach base and said lead-in base, said flux shield is adapted to control an amount of a magnetic flux density and the attachment force of said magnets.

3. A manikin having removable limbs attached thereto by an assembly according to claim 1, wherein said magnets are mounted within magnetic rooms or compartments formed inside of said attach base and said lead-in base respectively.

4. A manikin having removable limbs attached thereto by an assembly according to claim 3, wherein said magnets accommodated within said attach base are North Pole magnets and said magnets accommodated within said lead-in base are South Pole magnets.

5. A manikin having removable limbs attached thereto by an assembly according to claim 1, wherein said guiding means are a lead-in pin protruding from said lead-in base and a locating block also protruding from said lead-in base, said lead-in pin having a configuration of a hook to hook said limb into said torso to share a part of the holding force of said limb on said torso and to add a level of stability allowing said limbs to pivot or sway and return to their original position,
   wherein said lead-in pin and said locating block are adapted to be accommodated within corresponding openings formed in said attach base.

6. A manikin having removable limbs attached thereto by an assembly according to claim 2, wherein the thickness of said flux shield is between 1 and 2 mm, and thickness and diameter of said magnets is between 10 mm and 20 mm depending on the joint of said manikin.

7. A manikin having removable limbs attached thereto by a magnetic assembly according to claim 5, wherein said lead-in pin has a conical configuration and extends downwardly and said locating block has a rectangular configuration, said location block is mounted below said lead-in pin.

8. A manikin having removable limbs attached thereto by a magnetic assembly comprising:
   an attach base adapted to accommodate a set of magnets of one Pole, said attach base is adapted to be mounted within a torso of said manikin;
   a lead-in base also adapted to accommodate a set of magnets of the opposite Pole, said lead-in base is adapted to be mounted within limbs of said manikin;
   wherein each of said magnets of one Pole is adapted to attract corresponding magnets of the opposite Pole, thus facilitating self-aligning action of said magnets;
   said attach base and said lead-in base are provided with regulating force means adapted to regulate an attachment force of said magnets incorporated in said attach base and said lead-in base in different situations of manikin arrangements;
   said attach base and said lead-in base are provided with a complimentary guiding means to give an assembler of said manikin a sense of touch to understand of where a terminus of said limbs is with respect to said torso when forming a joint, wherein said guiding means forms a part of holding force of said limbs on said torso and adds a level of stability if said assembly is accidentally bumped,
   wherein depth-of-pull force of said magnets is not more than 80 Gauss, and
   wherein said regulating force means is a layer of flux shield placed over said magnets in said attach base and said lead-in base, said flux shield is adapted to control amount of a magnetic flux density and the attachment force of said magnets.

9. A manikin having removable limbs attached thereto by a magnetic assembly according to claim 8, wherein said magnets are mounted within magnetic rooms or compartments formed inside of said attach base and said lead-in base respectively.

10. A manikin having removable limbs attached thereto by a magnetic assembly according to claim 8, wherein said magnets accommodated within said attach base are North Pole magnets and said magnets accommodated within said lead-in base are South Pole magnets.

11. A manikin having removable limbs attached thereto by a magnetic assembly according to claim 8, wherein said guiding means is a lead-in pin protruding from said lead-in base and a locating block also protruding from said lead-in base, said lead-in pin has a configuration of a hook to hook said limb into said torso to share a part of the holding force of said limb on said torso and to add a level of stability allowing said limbs to pivot or sway and return to their original position,
   wherein said lead-in pin and said locating block are adapted to be accommodated within corresponding openings formed in said attach base.

12. A manikin having removable limbs attached thereto by a magnetic assembly according to claim 11, wherein said lead-in pin has a conical configuration and extends downwardly and said locating block has a rectangular configuration, said location block is mounted below said lead-in pin.

13. A manikin having removable limbs attached thereto by a magnetic assembly according to claim 8, wherein the thickness of said flux shield is between 1 and 2 mm, and thickness and diameter of said magnets is between 10 mm and 20 mm depending on the joint of said manikin.

14. A manikin having removable limbs attached thereto by a magnetic assembly according to claim 8, wherein said flux shield is formed of injection-molded polycarbonate.

15. A manikin having removable limbs attached thereto by a magnetic assembly comprising:
   an attach base adapted to accommodate a set of magnets of one Pole, said attach base is adapted to be mounted within a torso of said manikin;
   a lead-in base also adapted to accommodate a set of magnets of the opposite Pole, said lead-in base is adapted to be mounted within limbs of said manikin;
   wherein each of magnets of one Pole is adapted to attract corresponding magnet of the opposite Pole, thus facilitating self-aligning action of said magnets;
   said attach base and said lead-in base are provided with regulating force means adapted to regulate an attachment force of said magnets incorporated in said attach base and said lead-in base in different situations of manikin arrangements;
   said attach base and said lead-in base are provided with a complimentary guiding means to give an assembler of said manikin a sense of touch to understand of where a terminus of said limbs is with respect to said torso when forming a joint, wherein said guiding means forms a part of holding force of said limbs on said torso and adds a level of stability if said assembly is accidentally bumped, and
   wherein depth-of-pull force of said magnets is not more than 80 Gauss,
      wherein said regulating force means is a layer of flux shield placed over said magnets in said attach base and said lead-in base, said flux shield is adapted to control amount of a magnetic flux density and the attachment force of said magnets;
   wherein said magnets accommodated within said attach base are North Pole magnets and said magnets accommodated within said lead-in base are South Pole magnets.

16. A manikin having removable limbs attached thereto by an assembly according to claim 15, wherein said guiding means is a lead-in pin protruding from said lead-in base and a locating block also protruding from said lead-in base, said lead-in pin has a configuration of a hook to hook said limb into said torso to share a part of the holding force of said limb on said torso and to add a level of stability allowing said limbs to pivot or sway and return to their original position,
   wherein said lead-in pin and said locating block are adapted to be accommodated within corresponding openings formed in said attach base;
   wherein said lead-in pin has a conical configuration and extends downwardly and said locating block has a rectangular configuration, said location block is mounted below said lead-in pin.

* * * * *